US009870279B2

United States Patent
Kikuchi et al.

(10) Patent No.: US 9,870,279 B2
(45) Date of Patent: Jan. 16, 2018

(54) ANALYSIS APPARATUS AND ANALYSIS METHOD

(71) Applicant: HITACHI, LTD., Tokyo (JP)

(72) Inventors: Katsuro Kikuchi, Tokyo (JP); Masashi Egi, Tokyo (JP); Daisuke Tashiro, Tokyo (JP); Takao Sakurai, Tokyo (JP); Masayoshi Mase, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 14/915,299

(22) PCT Filed: Jan. 29, 2014

(86) PCT No.: PCT/JP2014/051941
§ 371 (c)(1),
(2) Date: Feb. 29, 2016

(87) PCT Pub. No.: WO2015/114753
PCT Pub. Date: Aug. 6, 2015

(65) Prior Publication Data
US 2016/0210181 A1 Jul. 21, 2016

(51) Int. Cl.
*G06F 11/00* (2006.01)
*G06F 11/07* (2006.01)
*G06F 11/34* (2006.01)

(52) U.S. Cl.
CPC ........ *G06F 11/079* (2013.01); *G06F 11/0751* (2013.01); *G06F 11/0787* (2013.01);
(Continued)

(58) Field of Classification Search
USPC ....................................................... 714/38.1
See application file for complete search history.

(56) References Cited

U.S. PATENT DOCUMENTS

2008/0155340 A1* 6/2008 Tsun ................. G06F 17/30011
714/38.14
2010/0329573 A1 12/2010 Tsujino et al.
(Continued)

FOREIGN PATENT DOCUMENTS

JP 2011-008622 A 1/2011
JP 2011-165059 A 8/2011
(Continued)

*Primary Examiner* — Sarai Butler
(74) *Attorney, Agent, or Firm* — Volpe and Koenig, P.C.

(57) ABSTRACT

An analysis apparatus is connectable to a terminal capable of displaying web pages by accessing a web server capable of executing a web application. The analysis apparatus comprises a processor, a memory and an interface. The processor is configured to perform the following processing of: receiving at least one log concerning the web application stored in the terminal from the terminal via the interface; acquiring a plurality of kinds of use condition feature values based on the log received, the plurality of kinds of use condition feature values being information characterizing conditions of use of the web application; analyzing whether a correlation exists between a first kind of use condition feature values and a second kind of use condition feature values in the plurality of kinds of use condition feature values acquired in the processing of acquiring; and outputting an analysis result obtained by the processing of the analyzing.

9 Claims, 20 Drawing Sheets

(52) U.S. Cl.
CPC ...... *G06F 11/3409* (2013.01); *G06F 11/3419* (2013.01); *G06F 11/3452* (2013.01); *G06F 11/3476* (2013.01); *G06F 2201/875* (2013.01)

(56) References Cited

U.S. PATENT DOCUMENTS

| | | | |
|---|---|---|---|
| 2012/0143947 A1* | 6/2012 | Kikuchi | G06Q 30/02 709/203 |
| 2012/0150909 A1* | 6/2012 | Alexander | H04W 8/265 707/770 |
| 2012/0166883 A1 | 6/2012 | Miyazaki et al. | |
| 2013/0198333 A1 | 8/2013 | Nakamura et al. | |
| 2015/0332147 A1* | 11/2015 | Anastas | G06N 5/04 706/12 |

FOREIGN PATENT DOCUMENTS

| | | |
|---|---|---|
| JP | 2012-094046 A | 5/2012 |
| JP | 2012-138001 A | 7/2012 |
| JP | 2012-185760 A | 9/2012 |
| JP | 2013-089018 A | 5/2013 |

* cited by examiner

OPERATION LOG TABLE 431

| PAGE ID | TIME | EVENT | OBJECT IDENTIFICATION INFORMATION | ATTRIBUTE VALUES |
|---|---|---|---|---|
| PID1 | 1371693807010 | load | xpath:HTML[0] | http://example.com/url1 PID0 800 2000 800 700 0 0 |
| PID1 | 1371693807200 | focus | xpath:HTML[0] | |
| PID1 | 1371693810876 | mousemove | xpath:HTML[0]/DIV[0] | 20 20 |
| PID1 | 1371693810920 | mousemove | xpath:HTML[0]/DIV[0] | 35 25 |
| .. | .. | .. | .. | .. |
| PID1 | 1371694010654 | unload | xpath:HTML[0] | |
| PID2 | | | | |
| .. | .. | | | |
| PID50 | 1371694276802 | click | xpath:HTML[0]/DIV[0]/INPUT[2] | |
| PID50 | 1371694278601 | change | xpath:HTML[0]/DIV[0]/INPUT[2] | 180-0001 |
| .. | .. | | | .. |

Fig. 2

ENVIRONMENTAL INFORMATION LOG TABLE

DISPLAY LOG TABLE 433

| PAGE ID | TIME | ELEMENT | OBJECT IDENTIFICATION INFORMATION | ATTRIBUTE VALUES |
|---|---|---|---|---|
| PID1 | 1371693807010 | input | id:userid | left: 200, top: 100 |
| PID1 | 1371693807010 | input | id:passwd | left: 200, top: 130 |
| PID1 | 1371693807010 | button | id:loginbtn | left: 200, top: 130 |
| PID1 | 1371693807010 | a | id:urla | exist:true |
| PID1 | 1371693807010 | a | id:urlb | exist:true |
| : | : | : | : | : |
| PID40 | 1371694108982 | input | id:userid | left: 0, top: 100 |
| PID40 | 1371694108982 | input | id:passwd | left: 0, top: 130 |
| PID40 | 1371694108982 | button | id:loginbtn | left: 0, top: 130 |
| PID40 | 1371694108982 | a | id:urla | exist: true |
| PID40 | 1371694108982 | a | id:urlb | exist: false |
| : | : | : | : | : |
| PID50 | 1371694278659 | body | error:error | errorinfo: syntax error line 370, xxx.html |
| PID40 | 1371694278659 | img | xpath:HTML[0]/DIV[0]/IMG[2] | http://example.com/test/img.gif left: 500, top: 100 |
| : | : | : | : | : |

401 points to the PID50 row; 402 points to the PID40 img row.

*Fig. 4*

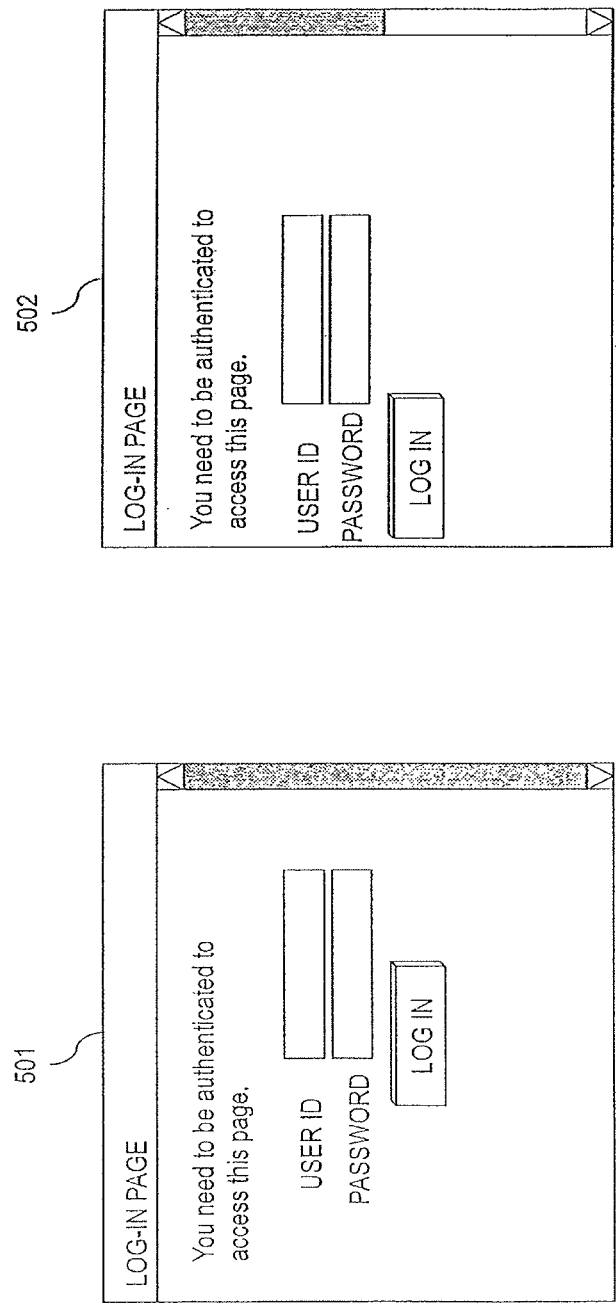

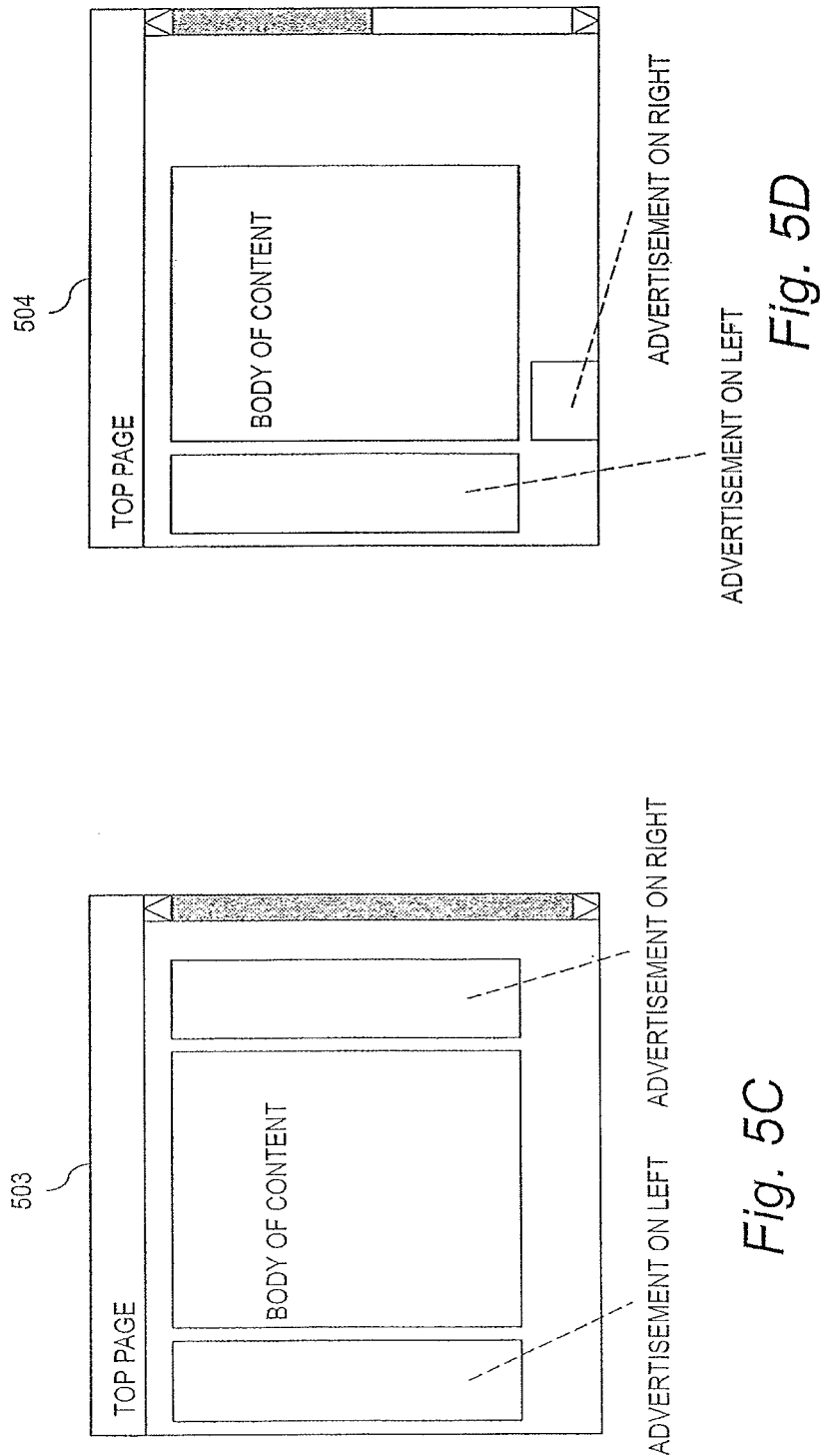

USE CONDITION FEATURE VALUE TABLE 434

| PAGE ID | c1 | c2 | c3 | c4 | c5 | c6 | c7 | c8 | c9 | c10 | c11 | c12 |
|---|---|---|---|---|---|---|---|---|---|---|---|---|
| PID1 | url1 | 2013-06-23 10:11 | url0 | url2 | 3.5 | 5 | 70% | ... | 5 | 0 | 5 | 0 |
| PID2 | url1 | 2013-06-23 10:22 | url0 | url2 | 3.2 | 4 | 80% | ... | 5 | 0 | 5 | 0 |
| : | : | : | : | : | : | : | : | ... | NULL | NULL | NULL | NULL |
| PID40 | url1 | 2013-06-23 13:07 | url0 | url1 | 8.0 | 0.5 | 20% | ... | -195 | 0 | -195 | 0 |
| : | : | : | : | : | : | : | : | ... | : | : | : | : |

| FIELD ID | USE CONDITION FEATURE VALUE ITEM |
|---|---|
| c1 | URL |
| c2 | VISIT DATE AND TIME |
| c3 | TRANSITION SOURCE URL |
| c4 | TRANSITION DESTINATION URL |
| c5 | RESPONSE TIME |
| c6 | STAY TIME |

| FIELD ID | USE CONDITION FEATURE VALUE ITEM |
|---|---|
| c7 | READ-THROUGH RATE |
| c8 | BROWSER TYPE |
| c9 | userid-left |
| c10 | userid-top |
| c11 | password-left |
| c12 | password-top |

Fig. 6

| EVENT NAME | EVENT TO BE RECORDED | DESCRIPTION OF RECORD | |
|---|---|---|---|
| | | COMMON INFORMATION | ATTRIBUTE (INFORMATION UNIQUE TO EVENT)<br>※ MULTIPLE ATTRIBUTES ARE TO BE SEPARATED BY SPACE |
| load | load | • PAGE ID<br>• TIME (IN UNIX TIME FORMAT WITH MILLISECOND PRECISION)<br>• EVENT<br>• OBJECT IDENTIFICATION INFORMATION<br><br>[POLICY TO ACQUIRE COMMON INFORMATION]<br>PAGE ID: FOLLOWING TIME + RANDOM NUMBER<br>TIME: USE getTime FUNCTION OF Data OBJECT<br>EVENT: ACQUIRE FROM type PROPERTY OF event OBJECT<br>OBJECT IDENTIFICATION INFORMATION:<br>ACQUIRE OBJECT FROM srcElement PROPERTY of event OBJECT, RECURSIVELY ACQUIRE parentNode OF ACQUIRED OBJECT, AND CREATE PATH FROM ROOT NODE IN XPath FORMAT | (1) URL OF DISPLAYED PAGE<br>(2) PAGE ID OF TRANSITION SOURCE PAGE<br>(3) WIDTH OF PAGE<br>(4) HEIGHT OF PAGE<br>(5) WIDTH OF BROWSER WINDOW<br>(6) HEIGHT OF BROWSER WINDOW<br>(7) VERTICAL SCROLL AMOUNT<br>(8) HORIZONTAL SCROLL AMOUNT |
| meta_srcurl | load | | (1) REFERER OF DISPLAYED PAGE (TRANSITION SOURCE URL) |
| focus | focus | | NULL |
| mousemove | mousemove | | (1) X-COORDINATE VALUE OF MOUSE CURSOR IN PAGE<br>(2) Y-COORDINATE VALUE OF MOUSE CURSOR IN PAGE |
| scroll | scroll | | (1) HORIZONTAL SCROLL AMOUNT<br>(2) VERTICAL SCROLL AMOUNT<br>(3) READ-THROUGH RATE |
| meta_desturl | click (RECORD WHEN <A> TAG IS CLICKED) | | (1) LINKED URL |
| unload | unload | | NULL |

ANALYSIS SCREEN (1300)

SELECT PAGE (1301)
- TOP PAGE ▽
- ENTER

SELECT EVALUATION INDEX ITEM (1302)
- STAY TIME ▽
- TARGET: 30 SEC OR MORE
- 0 SEC — 140 SEC
- FACTOR ANALYSIS

CANDIDATE FACTORS: (1303)

| ITEM | P-VALUE |
|---|---|
| RESPONSE TIME | 0.00 |
| READ-THROUGH RATE | 0.01 |
| LAYOUT COLLAPSE | 0.02 |
| : | |
| BROWSER TYPE | 0.37 |
| : | |

Fig. 13B

ANALYSIS SCREEN (1300)

SELECT PAGE (1301)
- TOP PAGE ▽
- ENTER

SELECT EVALUATION INDEX ITEM (1302)
- TRANSITION DESTINATION URL ▽
- TARGET:
  - URL1
  - URL2
  - URL3
  - URL4
- FACTOR ANALYSIS

CANDIDATE FACTORS: (1303)

| ITEM | P-VALUE |
|---|---|
| RESPONSE TIME | 0.00 |
| READ-THROUGH RATE | 0.01 |
| LAYOUT COLLAPSE | 0.02 |
| : | |
| BROWSER TYPE | 0.37 |
| : | |

WHEN CANDIDATE INDEX ITEM TAKES    1400A
      CONTINUOUS VALUES

| OBSERVED VALUE(Nij) | | CANDIDATE INDEX ITEM (RESPONSE TIME) | | MARGINAL DISTRIBUTION | MARGINAL PROBABILITY |
|---|---|---|---|---|---|
| | | x < 2 | x >= 2 | | |
| EVALUATION INDEX ITEM (TRANSITION DESTINATION URL) | URL2 | 200 | 400 | 600 | q1=60% |
| | Otherwise | 300 | 100 | 400 | q2=40% |
| MARGINAL DISTRIBUTION | | 500 | 500 | TOTAL 1000 | |
| MARGINAL PROBABILITY | | p1=50% | p2=50% | | |

Fig. 14A

WHEN CANDIDATE INDEX ITEM TAKES    1400B
      CATEGORICAL VALUES

| OBSERVED VALUE(Nij) | | CANDIDATE INDEX ITEM (BROWSER TYPE) | | | MARGINAL DISTRIBUTION | MARGINAL PROBABILITY |
|---|---|---|---|---|---|---|
| | | BROWSER FOR PC | BROWSER FOR SMARTPHONE | BROWSER FOR TABLET | | |
| EVALUATION INDEX ITEM (TRANSITION DESTINATION URL) | URL2 | 185 | 117 | 298 | 600 | q1=60% |
| | Otherwise | 115 | 83 | 202 | 400 | q2=40% |
| MARGINAL DISTRIBUTION | | 300 | 200 | 500 | TOTAL 1000 | |
| MARGINAL PROBABILITY | | p1=30% | p2=20% | p3=50% | | |

WHEN CORRELATION EXISTS

| EXPECTED VALUE(Eij) | | CANDIDATE INDEX ITEM (RESPONSE TIME) | | MARGINAL DISTRIBUTION | MARGINAL PROBABILITY |
|---|---|---|---|---|---|
| | | x < 2 | x >= 2 | | |
| EVALUATION INDEX ITEM(TRANSITION DESTINATION URL) | URL2 | 1000*p1*q1=300 | 1000*p2*q1=300 | 600 | q1=60% |
| | Otherwise | 1000*p1*q2=200 | 1000*p2*q2=200 | 400 | q2=40% |
| MARGINAL DISTRIBUTION | | 500 | 500 | TOTAL 1000 | |
| MARGINAL PROBABILITY | | p1=50% | p2=50% | | |

$$\chi^2 = \sum_{\substack{1 \le i \le r \\ 1 \le j \le c}} \frac{(N_{ij} - E_{ij})^2}{E_{ij}} \approx 166.6$$

Fig. 14C

WHEN NO CORRELATION EXISTS

| EXPECTED VALUE (Eij) | | CANDIDATE INDEX ITEM (BROWSER TYPE) | | | MARGINAL DISTRIBUTION | MARGINAL PROBABILITY |
|---|---|---|---|---|---|---|
| | | BROWSER FOR PC | BROWSER FOR SMARTPHONE | BROWSER FOR TABLET | | |
| EVALUATION INDEX ITEM (TRANSITION DESTINATION URL) | URL2 | 1000*p1*q1= 180 | 1000*p2*q1=120 | 1000*p3*q1= 300 | 600 | q1=60% |
| | Otherwise | 1000*p1*q2= 120 | 1000*p2*q2=80 | 1000*p3*q2= 200 | 400 | q2=40% |
| MARGINAL DISTRIBUTION | | 300 | 200 | 500 | TOTAL 1000 | |
| MARGINAL PROBABILITY | | p1=30% | p2=20% | p3=50% | | |

1400D

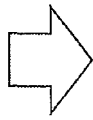

$$\chi^2 = \sum_{\substack{1 \leq i \leq r \\ 1 \leq j \leq c}} \frac{(N_{ij} - E_{ij})^2}{E_{ij}} \approx 1.9847$$

Fig. 14D

FACTOR DETAILS SCREEN

FACTOR: SCRIPT EXECUTION ERROR

TARGET PAGE: CHANGE REGISTRATION INFORMATION PAGE

FACTOR DETAILS:

| OBJECT TO BE OPERATED | EVENT | PROBABILITY OF OCCURRENCE |
|---|---|---|
| HTML[0]/DIV[0]/INPUT[2] | change | 100% |
| HTML[0]/DIV[0]/INPUT[2] | click | 80% |
| : | | |

Fig. 16A

FACTOR DETAILS SCREEN

FACTOR: SCRIPT EXECUTION ERROR

TARGET PAGE: TOP PAGE

FACTOR DETAILS:

dblclick: 100%
mouseover : 5%

BODY OF CONTENT

ADVERTISEMENT ON LEFT     ADVERTISEMENT ON RIGHT

Fig. 16B

ANALYSIS APPARATUS AND ANALYSIS METHOD

BACKGROUND OF THE INVENTION

This invention relates to an analysis apparatus and an analysis method for analyzing logs.

Techniques to detect a script error in executing an application are disclosed in, for example, JP 2012-138001 A and JP 2012-094046 A. JP 2012-138001 A discloses a system, a program, and a method for providing the user with an error-free operation procedure similar to the operation procedure having an error. JP 2012-094046 A discloses a device fault analysis apparatus, a device fault analysis method, and a device fault analysis program for determining whether a fault occurs in a device by detecting a mismatch between pattern information indicating features of the normal-time log and the operation log and determining whether the degree of the mismatch is higher than a predetermined threshold.

Techniques to detect a layout error are disclosed in, for example, JP 2011-008622 A. JP 2011-008622 A discloses a display test apparatus, a display test program, and a display test method for determining whether a content is correctly displayed through comparing a rendering result of the content with pre-registered reference information.

Websites have become more complicated in configuration because of diversification of user terminals and networks used by the users and further, linkage with external services represented by advertising networks. Accordingly, an administrator of a website finds difficulty in correctly grasping the conditions of a website experienced by users with the aforementioned existing techniques.

In the meanwhile, the fiercer competition increases the importance of differentiation among the experiences in using a service, creating a demand for grasping the conditions of a website experienced by the users and speedily addressing problematic conditions. However, grasping the actual conditions of the users from a user access log of a service system has a limit in the information on the users that can be extracted from the access log. In addition, the administrator of the website finds difficulty in determining which information more interests the users only from the extracted information.

SUMMARY OF THE INVENTION

This invention aims to facilitate determination of a factor to cause a problem.

An aspect of the invention disclosed in this application is an analysis apparatus and an analysis method for analyzing logs. The analysis apparatus is connectable to a terminal capable of displaying web pages by accessing a web server capable of executing a web application. The analysis apparatus comprises a processor capable of executing a program, a memory capable of storing the program, and an interface capable of controlling communications with the terminal. wherein the processor is configured to perform the following processing of: receiving at least one log concerning the web application stored in the terminal from the terminal via the interface; acquiring a plurality of kinds of use condition feature values based on the log received in the processing of receiving, the plurality of kinds of use condition feature values being information characterizing conditions of use of the web application; analyzing whether a correlation exists between a first kind of use condition feature values and a second kind of use condition feature values in the plurality of kinds of use condition feature values acquired in the processing of acquiring; and outputting an analysis result obtained by the processing of the analyzing.

A representative embodiment of this invention facilitates determination of a factor to cause a problem. The details of one or more implementations of the subject matter described in the specification are set forth in the accompanying drawings and the description below. Other features, aspects, and advantages of the subject matter will become apparent from the description, the drawings, and the claims.

BRIEF DESCRIPTION OF THE DRAWINGS

FIG. 2 is an explanatory diagram for illustrating an example of information stored in the operation log table held in the local disk of the log analysis server.

FIG. 4 is an explanatory diagram for illustrating an example of information stored in the display log table held in the local disk of the log analysis server.

FIG. 5A is an explanatory diagram for illustrating an example 1 of a screen to be displayed on a terminal.

FIG. 5B is an explanatory diagram for illustrating an example 2 of a screen to be displayed on a terminal.

FIG. 5C is an explanatory diagram for illustrating an example 3 of a screen to be displayed on a terminal.

FIG. 5D is an explanatory diagram for illustrating an example 4 of a screen to be displayed on a terminal.

FIG. 6 is an explanatory diagram for illustrating an example of information stored in the use condition feature value table held in the local disk of the log analysis server.

FIG. 9 is an explanatory diagram for illustrating an example of registered information of DOM event handlers referred to at Step S813.

FIG. 13A is an explanatory diagram for illustrating an example of an analysis screen in the case where the designated use condition feature value takes continuous values.

FIG. 13B is an explanatory diagram for illustrating an example of an analysis screen in the case where the selected use condition feature value takes categorical values.

FIG. 14A is an explanatory diagram for illustrating an example of a contingency table in the case where the use condition feature value of the analysis item takes continuous values.

FIG. 14B is an explanatory diagram for illustrating an example of a contingency table in the case where the use condition feature value of the analysis item takes categorical values.

FIG. 14C is an explanatory diagram for illustrating a result of a $\chi^2$ test using the contingency table in FIG. 14A.

FIG. 14D is an explanatory diagram for illustrating a result of a $\chi^2$ test using the contingency table 1400B in FIG. 14B.

FIG. 16A is an explanatory diagrams for illustrating an example 1 of a factor detail screen.

FIG. 16B is an explanatory diagrams for illustrating an example 2 of a factor detail screen.

DETAILED DESCRIPTION OF THE PREFERRED EMBODIMENT

This specification may refer to programs as agents for the sake of convenience; however, it should be noted that the actual agent that executes the programs is a processor.

Example of System Configuration

Figure 1:
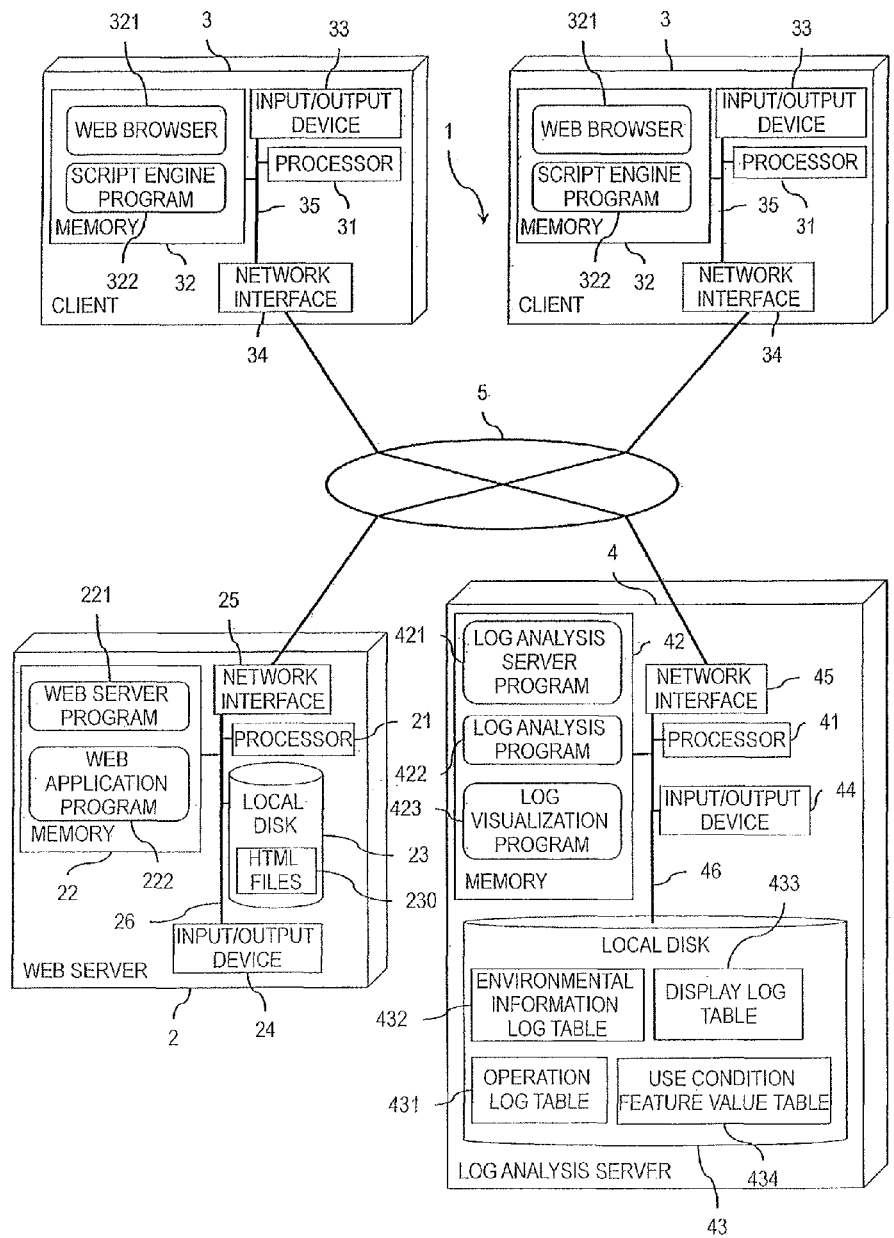
FIG. 1 is an explanatory diagram for illustrating an example of system configuration of an analysis system in this embodiment.

FIG. 1 is an explanatory diagram for illustrating an example of system configuration of an analysis system in this embodiment. The analysis system 1 includes a web server 2, terminals (clients) 3, and a log analysis server 4, which are connected to be able to communicate via a network 5 such as a LAN (Local Area Network), a WAN (Wide Area Network), or the Internet.

The web server 2 is a computer for sending web pages as responses to requests from the terminals 3. The web server 2 includes a processor 21, a memory 22, a local disk 23, an input/output device 24, and a network interface 25, which are connected by a bus 26.

The processor 21 controls the web server 2. The memory 22 serves as a working area of the processor 21. The memory 22 is a volatile storage medium for storing a web server program 221 and a web application program 222. The web server program 221 and the web application program 222 are loaded from the local disk 23 to the memory 22. The web server program 221 is a program for making the processor 21 control the web server 2. The web application program 222 is a program for making the processor 21 perform processing such as online shopping and web page search in response to requests from the terminals 3.

The local disk 23 is a non-volatile storage medium for storing data inclusive of the web server program 221, the web application program 222, and HTML (HyperText Markup Language) files 230 of web pages. The input/output device 24 represents devices for inputting or outputting data; the examples of the input/output device 24 include a keyboard, a mouse, a touch panel, a ten-key pad, a scanner, a monitor, and a printer. The network interface 25 connects to the network 5 to send and receive data.

The terminals 3 are computers to be monitored. Each terminal 3 includes a processor 31, a memory 32, a local disk (not shown), an input/output device 33, and a network interface 34, which are connected by a bus 35.

The processor 31 controls the terminal 3. The memory 32 serves as a working area of the processor 31. The memory 32 is a volatile storage medium for storing a web browser 321 and a script engine program 322. The web browser 321 and the script engine program 322 are loaded from the local disk to the memory 32. The web browser 321 is a program for making the processor 31 control displaying web pages received from the web server 2 and sending and receiving web pages. The script engine program 322 is a program for making the processor 31 execute script codes included in responses from the web server 2. The script code is a program to obtain various logs concerning the web browser 321 running on the terminal 3.

The input/output device 33 represents devices for inputting or outputting data; the examples of the input/output device 24 include a keyboard, a mouse, a touch panel, a ten-key pad, a scanner, a monitor, and a printer. The network interface 34 connects to the network 5 to send and receive data.

The log analysis server 4 is a computer for receiving the various logs acquired by script codes and monitoring the terminals 3. The log analysis server 4 includes a processor 41, a memory 42, a local disk 43, an input/output device 44, and a network interface 45, which are connected by a bus 46.

The processor 41 controls the log analysis server 4. The memory 42 serves as a working area of the processor 41. The memory 42 is a volatile storage medium for storing a log analysis server program 421, a log analysis program 422, and a log visualization program 423. The log analysis server program 421, the log analysis program 422, and the log visualization program 423 are loaded from the local disk 43 to the memory 42. The log analysis server program 421 is a program for making the processor 41 control the log analysis server 4. The log analysis program 422 is a program for making the processor 41 analyze operation logs, environmental information logs, or display logs, which are results of executing the script codes in the terminals 3. The log visualization program 423 is a program for making the processor 41 display results of the analysis by the log analysis program 422.

The operation log is a history of input operations such as mouse click with an input/output device 33 at a terminal 3. The environmental information log is a history of environmental information. The environmental information is information for specifying the environment for a terminal 3 to display a web page, such as the OS (Operating System) in use, the type of the web browser 321, the screen size, and the scroll position. The display log is a history of URLs (Uniform Resource Locators) designating the web pages displayed by the web browser 321.

The local disk 43 is a non-volatile storage medium for storing data inclusive of the log analysis server program 421, the log analysis program 422, and the log visualization program 423. The local disk 43 further stores an operation log table 431, an environmental information log table 432, a display log table 433, and a use condition feature value table 434. The details of the tables 431 to 434 will be described later.

The input/output device 44 represents devices for inputting or outputting data; the examples of the input/output device 44 include a keyboard, a mouse, a touch panel, a ten-key pad, a scanner, a monitor, and a printer. The network interface 45 connects to the network 5 to send and receive data.

Examples of Information Stored in Tables

FIG. 2 is an explanatory diagram for illustrating an example of information stored in the operation log table 431 held in the local disk 43 of the log analysis server 4. The operation log table 431 has a page ID field, a time field, an event field, an object identification information field, and an attribute value field; each operation has values in these fields. The values in the fields of each entry constitute an operation log record.

The page ID field stores page IDs. A page ID is identification information for uniquely identifying a web page viewed by a user. The time field stores the times at which the web pages are operated. The event field stores information for identifying events indicating the operations on the terminals 3.

The object identification information field stores object identification information. Object identification information is identification information for uniquely identifying an object in a web page operated in an event. For the identification information, the XPath or the id attribute assigned to the object can be used. The attribute value field stores attribute values concerning the events. In the case of the event "mousemove", the attribute values are values of an X-coordinate and a Y-coordinate indicating the position of the mouse cursor, like "20, 20".

Figure 3:
FIG. 3 is an explanatory diagram for illustrating an example of information stored in the environmental information log table held in the local disk of the log analysis server.

FIG. 3 is an explanatory diagram for illustrating an example of information stored in the environmental information log table 432 held in the local disk 43 of the log analysis server 4. The environmental information log table 432 has a page ID field, an OS field, a browser field, a client size field, and a scroll position field; each web page has values in these fields. The values in the fields for each web page constitute an environmental information log record. The description of the fields same as those in FIG. 2 is omitted.

The OS field stores information, such as the names of OSs, for identifying the OSs on which the web browsers 321 of the terminals 3 run. The browser field stores information, such as the names of the web browsers 321, for identifying the web browsers 321 of the terminals 3 running on the OSs identified with the OS field. The client size field stores client sizes. A client size is the size of the browser window displayed by the web browser 321 running on a terminal 3. The scroll position field stores scroll positions. A scroll position is a combination of values of an X-coordinate and a Y-coordinate indicating the scroll position when a web page has been rendered on a terminal 3.

FIG. 4 is an explanatory diagram for illustrating an example of information stored in the display log table 433 held in the local disk 43 of the log analysis server 4. The display log table 433 has a page ID field, a time field, an element field, an object identification information field, and an attribute value field; each object to be displayed in individual web pages has values in these fields. The values in the fields for each object to be displayed constitute a display log record. The display log table 433 is provided for each terminal 3. The description of the fields same as those in FIG. 2 or FIG. 3 is omitted.

The page ID field stores page IDs. The time field stores times at which the web pages are displayed. The element field stores element names for identifying element types of the objects included in the web pages. For example, object identification information "userid" and "passwd" are both <input> elements. An element name is specified with the name of an HTML tag.

The object identification information field stores object identification information. Object identification information is identification information for uniquely identifying an object displayed in a web page. For example, the object "userid" is an <input> element having an id attribute value "userid". In this example, the object "userid" corresponds to the entry box of the user ID in FIG. 5A or 5B. The attribute value field stores attribute values concerning the objects to be displayed. For example, if the element is "input", the attribute values are values (an X coordinate and a Y coordinate) indicating the display position of the entry box of the user ID, like "left: 200, top: 100".

The entry 401 is an entry of a web page in which a script error is detected. The entry 402 is an entry of a web page for which an image loading error is detected.

FIGS. 5A to 5D are explanatory diagrams for illustrating examples of screens to be displayed on a terminal 3. The example of the screen illustrated in FIG. 5A is a correctly displayed log-in page 501. The example of the screen illustrated in FIG. 5B is a log-in page 502 in which the layout of the <input> elements is collapsed. The example of the screen illustrated in FIG. 5C is a correctly displayed top page 503 and the example of the screen illustrated in FIG. 5D is a top page 504 in which the layout of the advertisements is collapsed. The display log table 433 stores display log records of the correctly displayed screens and the screens in which the layout is collapsed.

FIG. 6 is an explanatory diagram for illustrating an example of information stored in the use condition feature value table 434 held in the local disk 43 of the log analysis server 4. The use condition feature value table 434 is a table for storing use condition feature values, which are values of use condition feature value items. A use condition feature value is information for characterizing a use condition of a web page. The use condition feature value table 434 includes a page ID field, a URL field, a visit date and time field, a transition source URL field, a transition destination URL field, a response time field, a stay time field, a read-through rate field, a browser type field, a userid-left field, a userid-top field, a password-left field, and a password-top field; each web page has values (use condition feature values) in these fields. In this description, each field is referred to as use condition feature value item.

The URL field stores the URLs of web pages. The visit date and time field stores dates and times of visit. A date and time of visit is the date and the time when a terminal 3 accesses the web server 2 to retrieve a web page. The transition source URL field stores transition source URLs. A transition source URL is a URL representing the web page from which the web browser 321 jumps to the web page of the entry. The transition destination URL field stores transition destination URLs. A transition destination URL is a URL representing the web page to which the web browser 321 jumps from the web page of the entry.

The response time field stores response times. A response time is a time period after the terminal 3 has sent a request to the web server 2 until the terminal 3 receives a response. The stay time field stores stay times on the web pages. A stay time is a time period after the web browser 321 has jumped from the web page at the transition source URL until the web browser 321 jumps to the web page at the transition destination URL. The read-through rate field stores read-through rates on the web pages. A read-through rate is a percentage of the part of the web page estimated to be read by the user of a terminal 3, assuming the entire web page is 100%.

The browser type field stores information for identifying the browser types. Information for identifying a browser type is information for uniquely identifying a browser type, for example, the name or identifier of the browser type. The browser type is information for identifying the type of the browser, for example, browser for PC, browser for smartphone, or browser for tablet. The information for identifying the browser type is acquired from the environmental information log table 432.

The userid-left field stores values of userid-left. The userid-top field stores values of userid-top. The userid-left and the userid-top are coordinate values specifying the upper-left corner of the rectangular area for displaying the entry box of the user ID on the web page (see FIG. 5A). The userid-left is the coordinate value in the horizontal direction and the userid-top is the coordinate value in the vertical direction.

The password-left field stores values of password-left. The password-top field stores values of password-top. The password-left and the password-top are coordinate values specifying the upper-left corner of the rectangular area for displaying the entry box of the password on the web page (see FIG. 5A). The password-left is the coordinate value in the horizontal direction and the password-top is the coordinate value in the vertical direction.

Although FIG. 6 specifies the feature values of use conditions on the entry boxes of the user ID and the password, the use condition feature values are not limited to these but may include entry boxes of other objects, such as a comment or personal information.

Example of Operations

Figure 7:
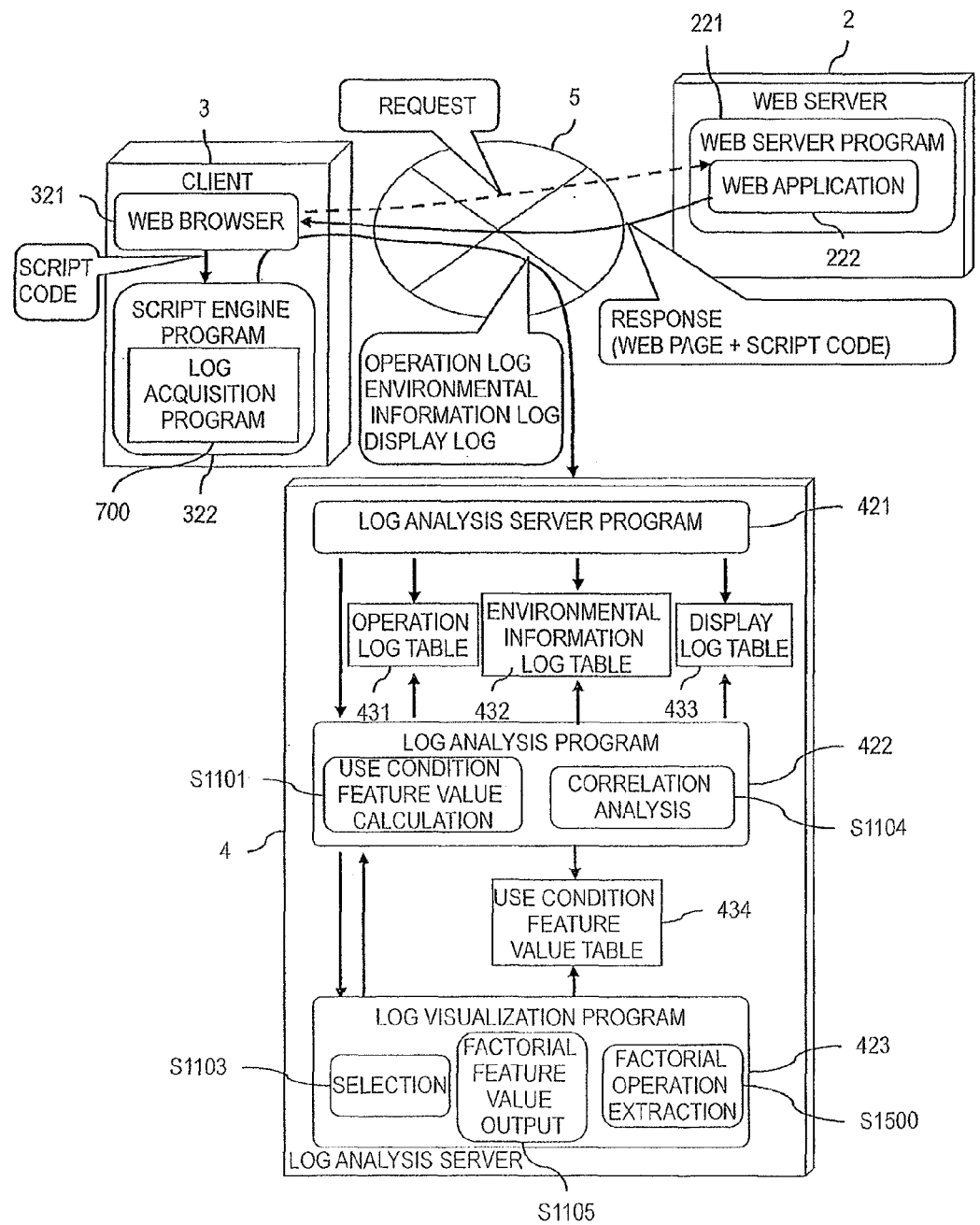
FIG. 7 is an explanatory diagram for illustrating an example of functional configuration of the analysis system.
Figure 8:
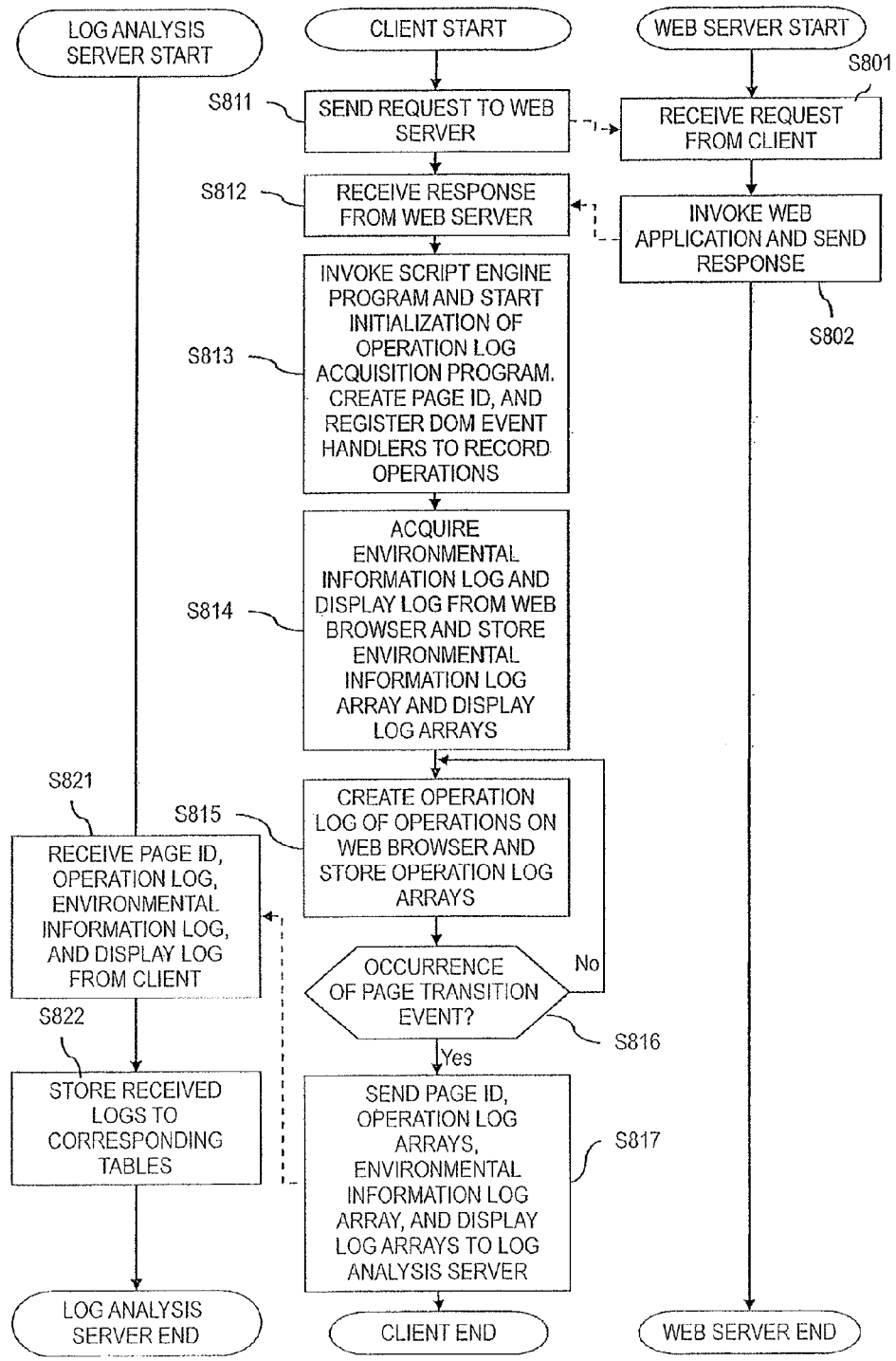
FIG. 8 is a sequence diagram for illustrating an example of processing in the analysis system in time series.

FIG. 7 is an explanatory diagram for illustrating an example of functional configuration of the analysis system 1 and FIG. 8 is a sequence diagram for illustrating an example of processing in the analysis system 1 in time series. The web server 2 receives a request for a web page sent at Step S811 from a terminal 3 with the web server program 221 (Step S801). The web server 2 invokes the web application program 222 associated with the received request with the web server program 221 and returns a response to the terminal 3 with the web application program 222 (Step S802). The response includes the requested web page and a script code.

The terminal 3 sends the request for a web page to the web server 2 (Step S811). As a result, the terminal 3 receives a response sent from the web server 2 at Step S802 (Step S812). Upon receipt of the response, the terminal 3 invokes the script engine program 322 and executes the received script code or the log acquisition program 700 (Step S813). The log acquisition program 700 may create a page ID of the received web page and register Document Object Model (DOM) event handlers for recording logs.

FIG. 9 is an explanatory diagram for illustrating an example of registered information of DOM event handlers referred to at Step S813. Returning to FIG. 8, the terminal 3 acquires environmental information and information on the screen display from the web browser 321 with the log acquisition program 700 and stores the environmental information and the information on the screen display to an environmental log array and display log arrays as an environmental information log and a display log (Step S814). The terminal 3 further creates an operation log of the operations on the web browser 321 and stores information on the operations to operation log arrays with the log acquisition program 700 (Step S815).

Next, the terminal 3 waits for occurrence of a page transition event of the web page (Step S816: No). If a page transition event occurs (Step S816: Yes), the terminal 3 sends the page ID of the transition source web page, the operation log arrays, the environmental information log array, and the display log arrays to the log analysis server 4 with the log acquisition program 700 (Step S817). For the transition destination web page, the terminal 3 executes Steps S811 to S815.

The log analysis server 4 receives the information sent at Step S817 from the terminal 3 (Step S821). The log analysis server 4 stores the page ID and the operation log arrays to the operation log table 431, stores the page ID and the environmental information log array to the environmental information log table 432, and stores the page ID and the display log arrays to the display log table 433 with the log analysis server program 421 (Step S822).

Figure 10A:
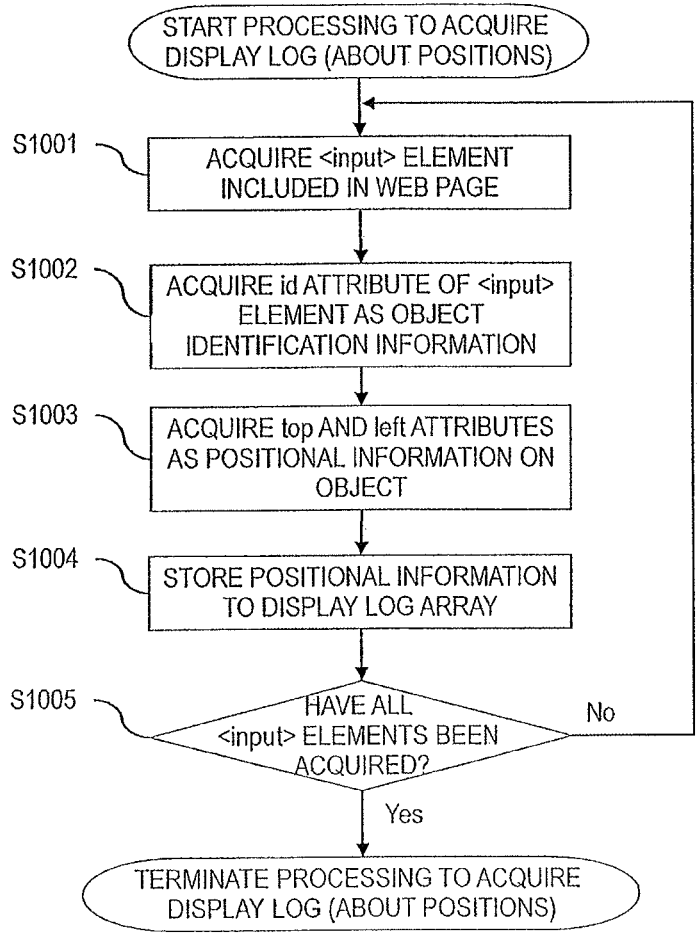
FIG. 10A is a flowchart of an example 1 of processing to acquire a display log illustrated in Step S814 of FIG. 8.

FIG. 10A is a flowchart of an example 1 of processing to acquire a display log illustrated in Step S814 of FIG. 8. FIG. 10A is a flowchart in the case where the display log includes positional information. This section describes a case of <input> elements by way of example; the same applies to the other elements indicated by positions. First, the log acquisition program 700 acquires an <input> element included in the web page (Step S1001). Next, the log acquisition program 700 acquires the id attribute of the <input> element from the web page as object identification information (Step S1002). The log acquisition program 700 acquires the top attribute (a Y-coordinate value) and the left attribute (an X-coordinate value) as positional information on the object (Step S1003). The log acquisition program 700 subsequently stores the acquired object identification information and positional information to a display log array (Step S1004).

The log acquisition program 700 determines whether all the <input> elements have been acquired (Step S1005) and if all the <input> elements have not been acquired (Step S1005: No), the program 700 returns to Step S1001. If all the <input> elements have been acquired (Step S1005: Yes), the program 700 terminates the processing to acquire a display log. The log acquisition program 700 may acquire not only the positional information but also the size information on the objects. In this case, the log acquisition program 700 acquires the height and the width of the object at Step S1003 and stores the height and the width as size information to the display log array at Step S1004.

Figure 10B:
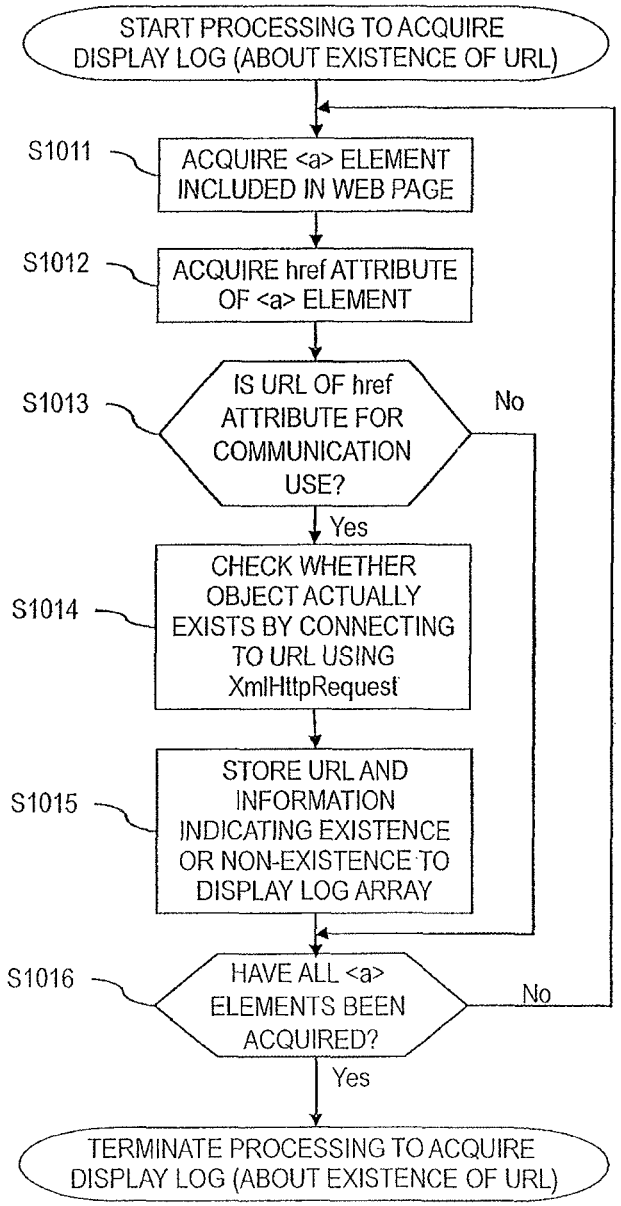
FIG. 10B is a flowchart of an example 2 of processing to acquire a display log illustrated in Step S814 of FIG. 8.

FIG. 10B is a flowchart of an example 2 of processing to acquire a display log illustrated in Step S814 of FIG. 8. FIG. 10B is a flowchart in the case where the display log includes information indicating existence of a URL. First, the log acquisition program 700 acquires an <a> element included in the web page (Step S1011). Next, the log acquisition program 700 acquires the href attribute of the <a> element as object identification information (Step S1012). The log acquisition program 700 determines whether the URL of the href attribute, or the link destination of the web page, is a URL for communication use (Step S1013). For example, the log acquisition program 700 determines that a URL beginning with a URI "http://", "https://", or "ftp://" is a URL for communication use.

If not determining that the URL is a URL for communication use (Step S1013: No), the log acquisition program 700 proceeds to Step S1016. If determining that the URL is a URL for communication use (Step S1013: Yes), the log acquisition program 700 connects to the URL corresponding to the href attribute with an XmlHttpRequest to check the existence of the URL of the href attribute (Step S1014). The log acquisition program 700 stores the URL corresponding to the href attribute and information indicating the existence or non-existence to a display log array (Step S1015).

The log acquisition program 700 determines whether all the <a> elements have been acquired (Step S1016) and if all the <a> elements have not been acquired (Step S1016: No), the program 700 returns to Step S1011. If all the <a> elements have been acquired (Step S1016: Yes), the program 700 terminates the display log acquisition processing.

Figure 11:
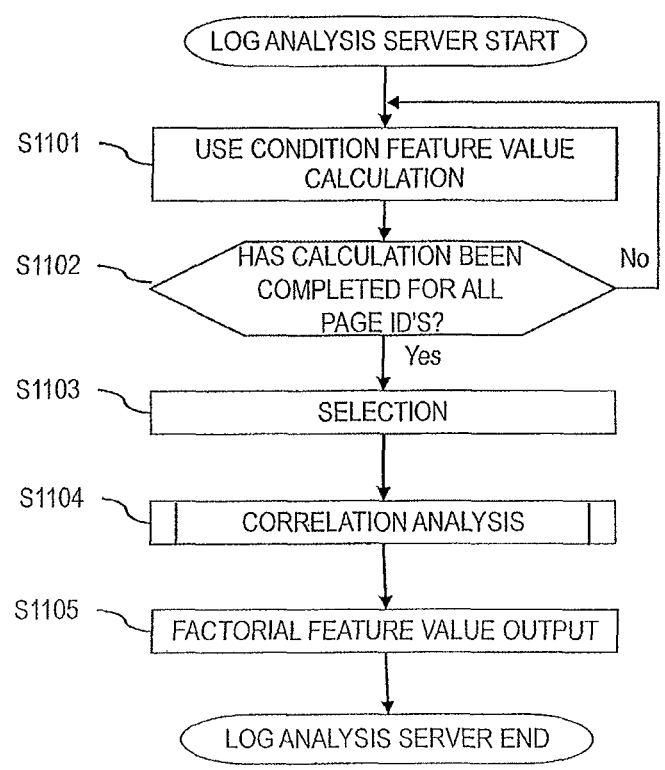
FIG. 11 is a flowchart of an example of processing of the log analysis server.

FIG. 11 is a flowchart of an example of processing of the log analysis server 4. The example of processing illustrated in FIG. 11 can be executed in a batch or in response to an instruction by operation of the user after Step S822 in FIG. 8.

The log analysis server 4 first executes use condition feature value calculation with the log analysis program 422 (Step S1101). In the use condition feature value calculation (Step S1101), the log analysis server 4 acquires log records from the operation log table 432, the environmental information log table 432, and the display log table 433 on a page ID basis. The log analysis server 4 calculates use condition feature values from the acquired log records and stores the calculated use condition feature values to the use condition feature value table 434.

Specifically, the log analysis program 422 acquires the first value in the attribute values of the load event in the operation log table 431 in FIG. 2 as a URL and stores the value to the URL field in the use condition feature value table 434. For example, the event of the first entry of the operation log table 431 is load. Accordingly, the log analysis program 422 acquires a value "http://example.com/url1", which is the first value of the attribute values for the page ID PID1, as a URL of the entry and stores the value to the URL field of the use condition feature value table 434.

The log analysis program 422 further stores the earliest time among the times for the same PID specified by the load event in the operation log table 431 of FIG. 2 to the visit date and time field. The earliest time is identified with the load event in the operation log table 431 in FIG. 2. For example, the event of the first entry of the operation log table 431 is load. Accordingly, the log analysis program 422 stores a value "2013-06-23 10:11" obtained by converting the time of the page ID PID1, "1371693807010", with a date-related library function to the visit date and time field of the use condition feature value table 434.

The log analysis program 422 further acquires the attribute value of the meta_srcurl event in the operation log table 431 in FIG. 2 as a transition source URL and stores the value to the transition source URL field of the use condition feature value table 434.

The log analysis program 422 further acquires the attribute value of the meta_desturl event in the operation log table 431 in FIG. 2 as a transition destination URL and stores the value to the transition destination URL field of the use condition feature value table 434. If a plurality of entries of meta_desturl events exist for the same page ID, the log analysis program 422 acquires the attribute value from the entry indicating the latest time.

The log analysis program 422 further stores a response time, which is the time after the terminal 3 has sent a request to the web server 2 until the terminal 3 receives a response, to the response time field in the use condition feature value table 434. For example, the response time is calculated by the time of unload event of the transition source page—the time of load event. In this connection, the page ID of the transition source URL is the information of the second attribute value of the load event.

The log analysis program 422 further stores a stay time, which is the time after the web browser 321 has jumped from the web page of the transition source URL until the web browser 321 jumps to the web page of the transition destination URL, to the stay time field in the use condition feature value table 434. For example, the response time is calculated by the time of the unload event—the time of the load event.

The log analysis program 422 further stores a read-through rate obtained from the scroll event in the DOM event handlers to the read-through rate field in the use condition feature value table 434. For example, the read-through rate is calculated by (the scroll amount in the longitudinal direction+the height of the window of the web browser 321)×100/the height of the page. The calculated read-through rate is stored in the operation log table 431 as an attribute value of the entry including a scroll event in the operation log table 431. The log analysis program 422 extracts the read-through rate from the attribute value of the entry including a scroll event and stores the read-through rate to the read-through rate field of the use condition feature value table 434.

The log analysis program 422 further acquires a value of the browser field of the environmental information log table 432, identifies the browser type, and stores information for identifying the identified browser type to the browser type field of the use condition feature value table 434.

The log analysis program 422 further acquires the values of the attribute value field of the display log table 433 and stores the horizontal coordinate and the vertical coordinate of the upper left corner of the user ID entry box of the web page to the userid-left field and the userid-top field, respectively. In similar, the log analysis program 422 stores the horizontal coordinate and the vertical coordinate of the upper left corner of the password entry box of the web page to the password-left field and the password-top field, respectively.

The log analysis server 4 repeats the use condition feature value calculation (Step S1101) until the log analysis server 4 completes the use condition feature value calculation (S1101) for all the page IDs (Step S1102: No). If the log analysis server 4 completes the use condition feature value calculation (Step S1101) for all the page IDs (Step S1102: Yes), the log analysis server 4 executes selection with the log visualization program 423 (Step S1103).

Specifically, the log visualization program 423 creates a list of URLs stored in the URL field of the use condition feature value table 434, displays the list on the web browser 321 of the log analysis server 4, and waits for a user operation for selecting a URL to be analyzed from the list.

Next, the log analysis server 4 executes correlation analysis with the log analysis program 422 (Step S1104). In the correlation analysis (Step S1104), the log analysis program 422 receives a designation of a use condition feature value item for an evaluation index item on the URL to be analyzed selected at Step S1103 and analyzes the correlations between the designated use condition feature value item and the other undesignated use condition feature value items (analysis items) to calculate correlation degrees representing the strengths of the correlations. The calculated correlation degrees are stored in a correlation degree array. The details of the correlation analysis (Step S1104) will be described with FIG. 12.

After the correlation analysis (Step S1104), the log analysis server 4 acquires combinations of the designated use condition feature value item and the other undesignated use condition feature value items (analysis items) and the correlation degrees of the individual combinations from the correlation degree array and displays the combinations and the correlation degrees on the web browser 321 (Step S1105). With this step, the log analysis server 4 terminates the processing.

Figure 12:
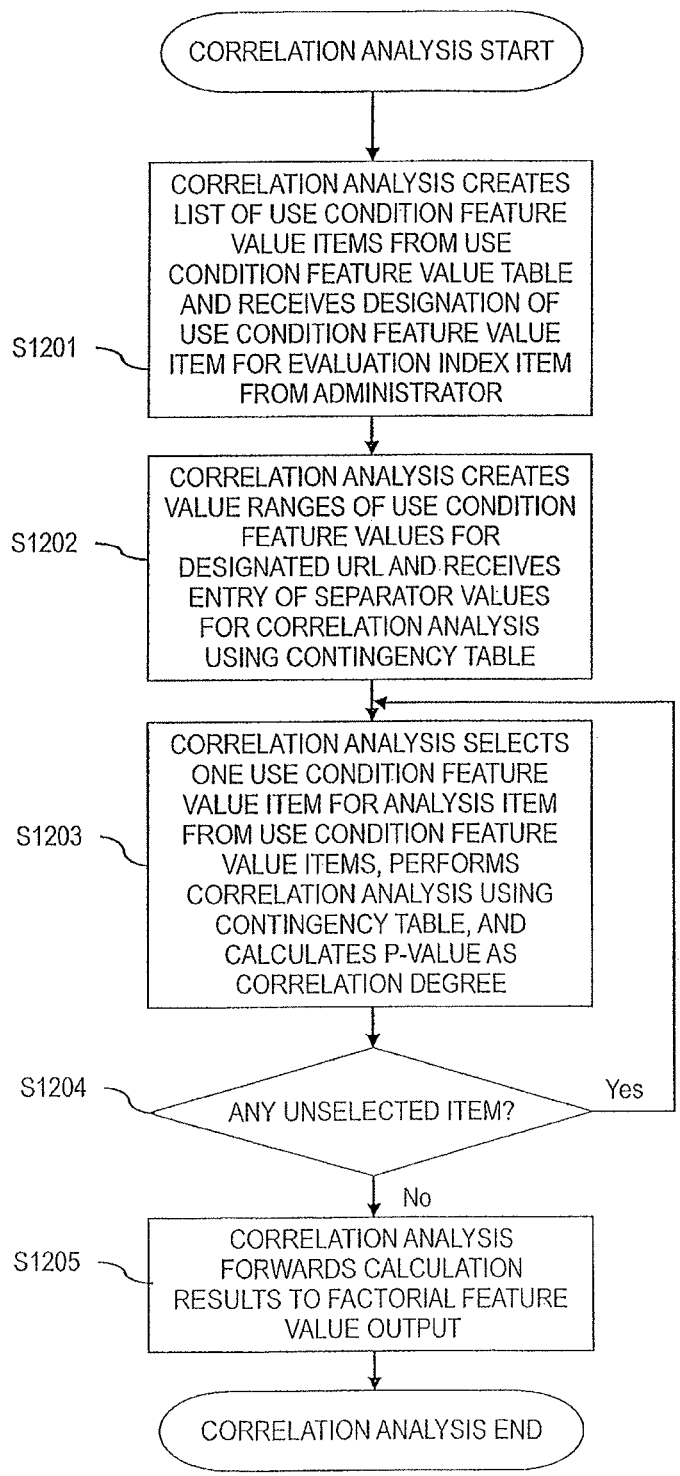
FIG. 12 is a flowchart of a detailed example of processing in the correlation analysis (Step S1104) shown in FIG. 11.

FIG. 12 is a flowchart of a detailed example of processing in the correlation analysis (Step S1104) shown in FIG. 11. The log analysis program 422 retrieves entries of the web page identified with the URL to be analyzed that has been selected in the selection (Step S1103) from the use condition feature value table 434 and receives designation of a use condition feature value item for an evaluation index item out of the use condition feature value items of the retrieved entries (Step S1201).

Next, the log analysis program 422 creates a value range for the use condition feature value of the evaluation index item and receives a separator value for the correlation analysis using a contingency table (Step S1202). A specific example of processing at Step S1202 will be described later.

The log analysis program 422 selects a use condition feature value item for an analysis item from a plurality of use condition feature value items (except for the use condition feature value item of the evaluation index item) and performs correlation analysis using the contingency table to calculate a p-value as correlation degree (Step S1203).

The p-value is calculated by using, for example, the following formulae (1) to (3).

$$f(x, v) = \frac{x^{v/2-1} e^{-x/2}}{2^{v/2} \Gamma(v/2)} \quad (1)$$

$$P(x, v) = \int_0^x f(t, v) dt \quad (2)$$

$$Q(x, v) = \int_x^\infty f(t, v) dt \quad (3)$$

Formula 1 expresses the probability density of chi-squared distribution; Formula 2 expresses the lower cumulative probability; and Formula 3 expresses the upper cumulative probability. Examples of calculation of a p-value will be described with FIGS. 14C and 14D.

Subsequently, the log analysis program 422 determines whether the log analysis program 422 has calculated p-values for all the use condition feature value items except for the use condition feature value item of the evaluation index item (Step S1204). If the log analysis program 422 has not calculated p-values for all of the use condition feature value items (Step S1204: No), the log analysis program 422 returns to Step S1203. If the log analysis program 422 has calculated p-values for all the use condition feature value items (Step S1204: Yes), the log analysis program 422 forwards the calculated p-values to the log visualization program 423 (Step S1205). With this step, the log analysis program 422 terminates the correlation analysis (Step S1104).

Now, the correlation analysis illustrated in FIG. 11 (Step S1104) is described using specific examples of two cases: a case where the designated use condition feature value takes continuous values and a case where the designated use condition feature value takes categorical values. First, the case where the designated use condition feature value takes continuous values is described.

FIG. 13A is an explanatory diagram for illustrating an example of an analysis screen in the case where the designated use condition feature value takes continuous values. The analysis screen 1300 is displayed on the display device by the web browser 321 of the log analysis server 4. A URL to be analyzed ("Top Page" in FIG. 13A) is entered in the Select Page section 1301 at Step S1103 in FIG. 11. Further, a use condition feature value item ("Stay Time" in FIG. 13A) is selected in the Select Evaluation Index Item section 1302 at Step S1201.

If the use condition feature value of the selected evaluation index item takes continuous values, the log analysis program 422 identifies entries of the use condition feature value table 434 in which the values of the URL field match the URL to be analyzed. For example, if the URL to be analyzed is "url1", the log analysis program 422 acquires all entries including a value "url1" in the URL field from the use condition feature value table 434.

The log analysis program 422 acquires all the values of the use condition feature value item of the evaluation index item selected at Step S1201 from the acquired entries and determines a value range defined by the highest value and the lowest value. In the case where the use condition feature value item of the evaluation index item is "stay time", the log analysis program 422 extracts all the stay times of the entries having a value "url1" in the URL field and identifies the longest stay time and the shortest stay time. In the example of the analysis screen 1300 in FIG. 13A, "0 sec" in the Select Evaluation Index Item section 1302 is the shortest stay time and "140 sec" is the longest stay time.

The log analysis program 422 receives entry of a separator value for correlation analysis using a contingency table. The separator value is a threshold to separate the aforementioned value range into two. In the example of FIG. 13A, a value "30 sec" is entered as the separator value. Accordingly, the value range is separated into a range not less than 0 seconds and less than 30 seconds and a range not less than 30 seconds and not more than 140 seconds. Although the number of separate ranges is not limited to two, this example employs two.

In response to press of the Factor Analysis button in the Select Evaluation Index Item section 1302, correlation analysis is executed using the contingency table to display a result of the correlation analysis using the contingency table in the Candidate Factors section 1303. About the item "layout collapse", values of the userid-left field, userid-top field, password-left field, and password-top field are analyzed.

FIG. 13B is an explanatory diagram for illustrating an example of an analysis screen in the case where the selected use condition feature value takes categorical values. The analysis screen 1300 is displayed on the display device by the web browser 321 of the log analysis server 4. A URL to be analyzed ("Top Page" in FIG. 13B) is entered in the Select Page section 1301 at Step S1103 in FIG. 11. Further, a use condition feature value item ("Transition Destination URL" in FIG. 13B) is selected in the Select Evaluation Index Item section 1302 at Step S1104.

If the use condition feature value of the selected evaluation index item takes categorical values, the log analysis program 422 identifies entries of the use condition feature value table 434 in which the values of the URL field match the URL to be analyzed. For example, if the URL to be analyzed is "url1", the log analysis program 422 acquires all entries including a value "url1" in the URL field from the use condition feature value table 434.

The log analysis program 422 acquires all the values of the use condition feature value item of the evaluation index item selected at Step S1201 from the acquired entries and creates a list of URLs excluding duplication and determines the list to be a value range. In the case where the use condition feature value of the evaluation index item is "transition destination URL", the log analysis program 422 extracts the values of the transition destination URL field from the entries having a value "url1" in the URL field. For example, if values of url1, url2, url2, url3, url3, url3, url4, url4, url4, and url4 are acquired as the transition destination URLs, the log analysis program 422 creates a list of URLs including url1, url2, url3, and url4 by excluding duplication.

The log analysis program 422 receives entry of a separator value for correlation analysis using a contingency table. The separator value is a threshold to separate the aforementioned value range into two. In the example of FIG.

13B, a value "url2" is entered as the separator value. Accordingly, the value range is separated into the value url2 and the remaining values url1, url3, and url4.

In response to press of the Factor Analysis button in the Select Evaluation Index Item section 1302, correlation analysis is executed using the contingency table to display a result of the correlation analysis using the contingency table in the Candidate Factors section 1303. About the item "layout collapse", values of the userid-left field, userid-top field, password-left field, and password-top field are analyzed.

Example of Calculating P-Value Using Contingency Table

FIG. 14A is an explanatory diagram for illustrating an example of a contingency table in the case where the use condition feature value of the analysis item takes continuous values. In the contingency table 1400A, i in an observed value Nij represents the group of the use condition feature value item (in this example, transition destination URL) of the evaluation index item and j represents the group of the candidate index item (x) (in this example, response time [sec]) or the group of the use condition feature value item of the analysis item. In this example, i=1 means the separator value (URL2) set to the value range and i=2 means the URLs other than the URL specified with i=1.

When the candidate index item (x) or the use condition feature value of the analysis item takes continuous values, the values are separated at the median. Regarding the response time of the candidate index item (x) in this example, the response times are retrieved from the entries of the use condition feature value table 434 in FIG. 6 having a value "URL2" in the transition destination URL of the use condition feature value item of the evaluation index item and the median of the response times is employed. In this example, the median of the response times is determined to be 2 by way of example. That is to say, j=1 is represented by x<2 and j=2 is represented by x>=2. Instead of the median, the separator value may be the mean or a different statistical value.

This contingency table 1400A indicates that the observed value $N_{11}$ for the response times taking less than 2 seconds to jump to URL2, that the observed value $N_{12}$ for the response times taking not less than 2 seconds to jump to URL2 is 400, that the observed value $N_{21}$ for the response times taking less than 2 seconds to jump to an URL other than URL2 is 300, and that the observed value $N_{22}$ for the response times taking not less than 2 seconds to jump to an URL other than URL2 is 100.

FIG. 14B is an explanatory diagram for illustrating an example of a contingency table in the case where the use condition feature value of the analysis item takes categorical values. In the contingency table 1400B, i in the observed value Nij represents the use condition feature value item (in this example, transition destination URL) of the evaluation index item and j represents the group of the candidate index item (x) (in this example, browser type) or the group of the use condition feature value item of the analysis item. In this example, i=1 means the separator value (URL2) set to the value range and i =2 means the URLs other than the URL specified with i=1.

When the candidate index item (x) or the use condition feature value of the analysis item takes categorical values, the values are separated depending on the type. Regarding the browser type of the candidate index item (x) in this example, the browser types are retrieved from the entries of the use condition feature value table 434 in FIG. 6 having a value "URL2" in the transition destination URL or the use condition feature value item of the evaluation index item and the retrieved browser types are employed. In this example, the browser types are separated into the browser for PC (j=1), the browser for smartphone(j =2), and the browser for tablet (j=3).

The separation policy may be specified in advance. For example, if the policy categorizes browsers into browser for stationary PC and browser for portable computer, the browser types are separated into browser for PC and browser for portable computer. The browser for portable terminal includes browser for smartphone and browser for tablet.

This contingency table indicates that, with respect to the number of times of jumping to URL2 by each browser type, the observed value $N_{11}$ in the case of browser for PC is 185, the observed value $N_{12}$ in the case of browser for smartphone is 117, and the observed value $N_{13}$ in the case of browser for tablet is 298. Likewise, the contingency table 1400B indicates that, with respect to the number of times of jumping to a URL other than URL2 by each browser type, the observed value $N_{21}$ in the case of browser for PC is 115, the observed value $N_{22}$ in the case of browser for smartphone is 83, and the observed value $N_{23}$ in the case of browser for tablet is 202.

FIG. 14C is an explanatory diagram for illustrating a result of a $\chi^2$ test using the contingency table 1400A in FIG. 14A. FIG. 14C illustrates a case where a correlation exists. According to the $\chi^2$ test result 1400C in FIG. 14C, when the significance level is 5% and the degree of freedom is 1 (=(the number of columns −1)×(the number of rows−1)), the value of the $\chi^2$ distribution (upper 5% critical value) is 3.84146. The $\chi^2$ value in the $\chi^2$ test result 1400C is 166.6. Accordingly, the null hypothesis is rejected, so that the log analysis program 422 determines that the response time of the candidate index item is correlated with the evaluation index item at the 5% significance level.

Furthermore, the p-value is calculated by substituting the degree of freedom of 1 (=(the number of columns−1)×(the number of rows−1)) and the χ2 value=166.6 to the foregoing formulae (1) to (3). In this example, the p-value is 0.00. Accordingly, in the Candidate Factors section 1303 in FIG. 13A, the p-value for the use condition feature value item of the analysis item "response time" is 0.00.

FIG. 14D is an explanatory diagram for illustrating a result of a $\chi^2$ test using the contingency table 1400B in FIG. 14B. FIG. 14D illustrates a case where no correlation exists. According to the $\chi^2$ test result 1400D in FIG. 14D, when the significance level is 5% and the degree of freedom is 2 (=(the number of columns−1)×(the number of rows−1)), the value of the $\chi^2$ distribution (upper 5% critical value) is 5.99146. The $\chi^2$ value of the $\chi^2$ test result 1400D is 1.9847. Accordingly, the null hypothesis is not rejected so that the log analysis program 422 does not determine that the browser type of the candidate index item is correlated with the evaluation index item at the 5% significance level.

Furthermore, the p-value is calculated by substituting the degree of freedom of 2 (=(the number of columns−1)×(the number of rows−1)) and the $\chi^2$ value=1.9847 to the foregoing formulae (1) to (3). In this example, the p-value is 0.37. Accordingly, in the Candidate Factors section 1303 in FIG. 13B, the p-value for the use condition feature value item of the analysis item "browser type" is 0.37.

Factorial Operation Extraction

Figure 15:
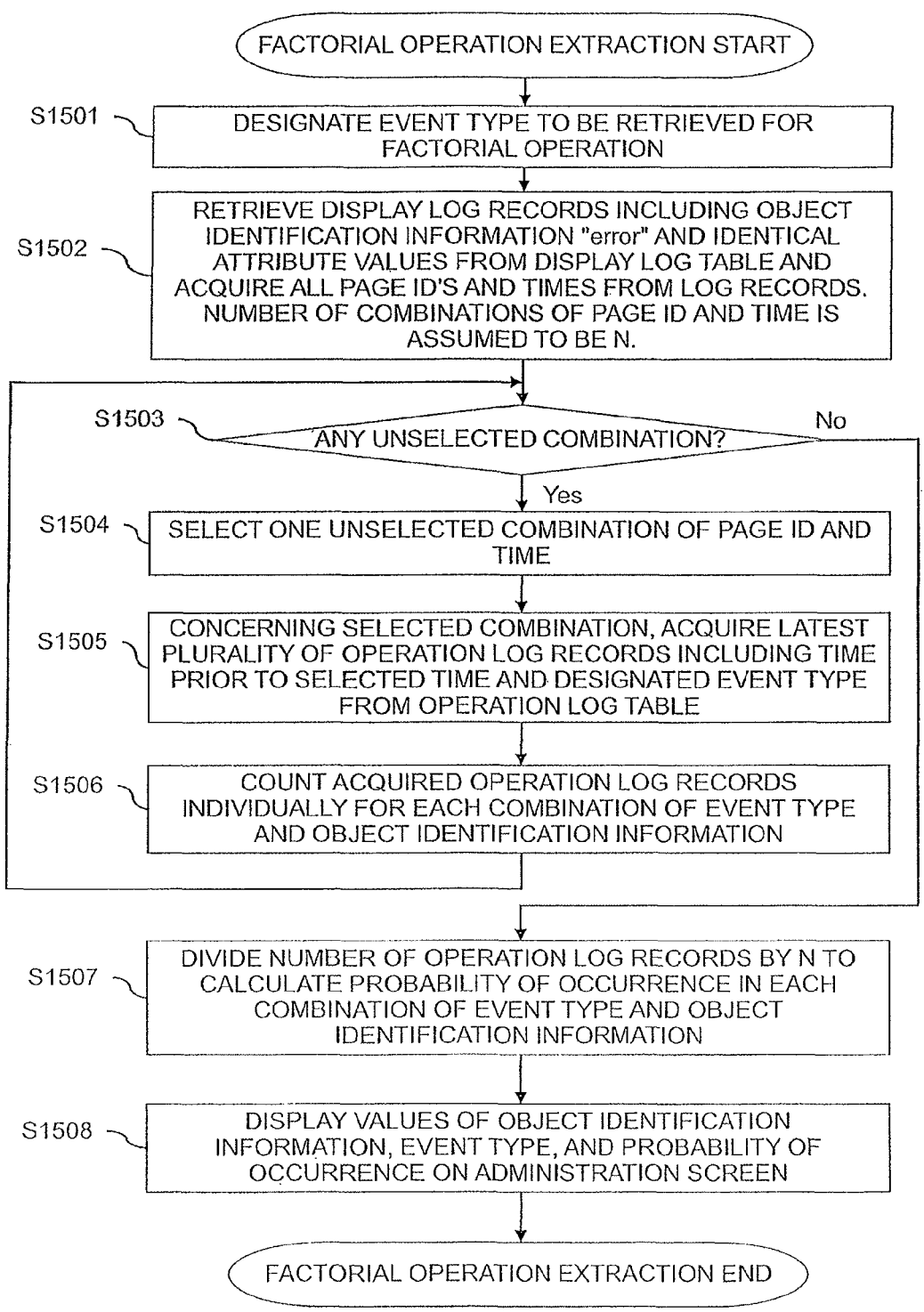
FIG. 15 is a flowchart of a detailed example of processing of the log visualization program in the log analysis server to extract factorial operations.

FIG. 15 is a flowchart of a detailed example of processing of the log visualization program 423 in the log analysis server 4 to extract factorial operations. The log visualization program 423 first designates event types to be retrieved for factorial operations (Step S1501). This example uses "click" and "change" as the event types to be retrieved for factorial operations.

Next, the log visualization program 423 retrieves entries including object identification information "error" and having identical attribute values from the display log table 433 and acquires all the page IDs and display times of the entries (Step S1502). The number of combinations of an acquired page ID and a display time is assumed to be N.

Next, the log visualization program 423 determines whether any unselected combination exists in the combinations of a page and a display time (Step S1503). If some unselected combination exists (Step S1503: Yes), the log visualization program 423 selects an unselected combination (Step S1504).

Concerning the combination selected at Step S1504, the log visualization program 423 acquires a plurality of operation log records including a time prior to the display time of the selected combination and an event included in the designated event types from the operation log table 431 in order from the latest in display time (Step S1505).

The log visualization program 423 individually counts the acquired operation log records for each combination of an event type and a value of object identification information (Step S1506) and returns to Step S1503. If no unselected combination exists at Step S1503 (Step S1503: No), the log visualization program 423 divides the number of operation log records obtained at Step S1506 by N in each combination of an event type and object identification information to calculate the probability of occurrence in the combination of the event type and the object identification information (Step S1507). The log visualization program 423 displays the probabilities of occurrence in individual combinations of an event type and an object (Step S1508) and terminates the processing to extract factorial operations.

Examples of Factor Details Screen

FIGS. 16A and 16B are explanatory diagrams for illustrating examples of a factor details screen. The factor details screen is a screen to be displayed at Step S1508 in FIG. 15. FIG. 16A provides an example in the case where the factor is script execution error and the target page is the Change Registration Information page. FIG. 16A indicates that when a "change" event is executed on the object to be operated identified with object identification information, a script execution error occurs with a 100% probability and when a "click" event is executed on the same object, a script execution error occurs with a 80% probability.

FIG. 16B provides an example in the case where the factor is script execution error and the target page is the top page. In the case of FIG. 16B, the object to be operated is the advertisement on the left and the events are dblclick (double-click) and mouseover (mouse-over). FIG. 16B indicates that a double-click on the advertisement on the left leads to occurrence of a script execution error with a 100% probability and that a mouse-over above the advertisement on the left leads to occurrence of a script execution error with a 5% probability.

The foregoing embodiment has described an example where the factorial operation extraction calculates and displays probabilities of occurrence; however, the extraction of factorial operations can output the numbers of log records as the frequencies of occurrence. In this case, calculation of N can be eliminated.

In the foregoing embodiment, the log analysis server 4 may receive index data identified with transaction IDs for identifying transactions in an on-line trading or user IDs from the web server 2 or a server other than the web server 2 and analyze whether correlations exist between the index data regarded as a use condition feature value item of an evaluation index item and other use condition feature value items.

In the foregoing embodiment, the correlation analysis analyzes whether a correlation exists between a use condition feature value of an evaluation index item and a use condition feature value of a candidate index item; however, the correlation analysis may separate the use condition feature values of the evaluation index item into two groups.

Specifically, the log analysis server 4 separates the use condition feature values of the evaluation index item into two groups of use condition feature values different in size of the log range and analyzes whether a correlation exists using the group of use condition feature values in the wider log range and the use condition feature values of a candidate index item. If determining that a correlation exists, the log analysis server 4 analyzes whether a correlation exists using the group of use condition feature values in the narrower log range and the use condition feature values of the candidate index item.

Specific examples of the group of use condition feature values in the wider log range and the group of use condition feature values in the narrower log range are described. In an example, the wider log range or the narrower log range may depend on whether the log records are about a specific web page or a series of web pages directed to the specific web page. The log records about the specific web page is in the narrower log range and the log records about a series of web pages directed to the specific web page are in the wider log range. The size of the wider log range depends on the term to acquire log records specified by, for example, the number of days or after the log-in.

In the case where the use condition feature value item is "response time", the use condition feature values in the narrower log range are the response times in the use condition feature value table 434 on the web page subject to the evaluation index item. The use condition feature values in the wider log range are the means (medians, maximums, minimums, or any values; the same applies hereinafter) of the response times in the use condition feature value table 434 on the series of web pages directed to the web page subject to the evaluation index item.

In the case where the use condition feature value item is "read-through rate", the use condition feature values in the narrower log range are the read-through rates in the use condition feature value table 434 on the web page subject to the evaluation index item. The use condition feature values in the wider log range are the means of the read-through rates in the use condition feature value table 434 on the series of web pages directed to the web page subject to the evaluation index item.

In the case where the use condition feature value item is "errors of script program", the use condition feature values in the narrower log range are the number of entries indicating an error of the script program in the attribute values of the display log table 433 on the web page subject to the evaluation index item. The use condition feature values in the wider log range are the means of the numbers of entries on the series of web pages directed to the web page subject to the evaluation index item.

Another example of grouping the log range into a wider log range and a narrower log range depends on whether the log records are about a specific entry item (for example, the entry box of a user ID) in a web page or entry items entered prior to the specific entry in the same web page. If the log records are about a specific entry item, the log range is the narrower log range; if the log records are about the other entry items, the log range is the wider log range. In still another example, an initially-displayed view range of a web page may be defined as narrower log range and the entire web page that can be viewed through scrolling may be defined as wider log range.

In the case where the use condition feature value item is "inputting time for an entry item" (not shown in the operation log table), the use condition feature values in the narrower log range are the inputting times (the periods from the time of the first key stroke to the time of the last key stroke) for an entry item in the web page subject to the evaluation index item. The use condition feature values in the wider log range are the means of the previous inputting times for all the entry items in the web page subject to the evaluation index item.

In the case where the use condition feature value item is "hover time for an entry item" (not shown in the operation log table), the use condition feature values in the narrower log range are the hover times (the periods from focusin to focusout) for an entry item in the web page subject to the evaluation index item. The use condition feature values in the wider log range are the means of the previous hover times for all the entry items in the web page subject to the evaluation index item.

The log analysis server 4 first analyzes whether a correlation exists using the use condition feature values in the wider log range and if the analysis determines that a correlation with the use condition feature value in the wider log range exists, the log analysis server 4 then analyzes whether a correlation exists using the use condition feature values in the narrower log range. This approach eliminates the correlation analysis using the use condition feature values in the narrower log range on the use condition feature value having no correlation, increasing efficiency in correlation analysis.

As set forth above, the embodiment of this invention facilitates locating a factor to cause a problem in a web application. Specifically, monitoring the terminals 3 in the practical environment leads to checking for an unknown problem in the website (web server 2). In addition, the embodiment facilitates grasping the level of effects of a problem on the service, such as the probability of occurrence of an error.

For example, acquiring use condition feature values from the operation logs facilitates analysis of the relations among the user operations on the terminals. The analysis result can be utilized for user behavior analysis. Acquiring use condition feature values of the operation logs and the environmental information logs facilitates correlation analysis on operations under a specific operational environment. Acquiring use condition feature values of the operation logs and the display logs facilitates analysis of the relations between the operation logs and the display logs, for example, in locating an operation causing a layout collapse in a web page.

It should be noted that this invention is not limited to the above-mentioned embodiments, and encompasses various modification examples and the equivalent configurations within the scope of the appended claims without departing from the gist of this invention. For example, the above-mentioned embodiments are described in detail for a better understanding of this invention, and this invention is not necessarily limited to what includes all the configurations that have been described. Further, a part of the configurations according to a given embodiment may be replaced by the configurations according to another embodiment. Further, the configurations according to another embodiment may be added to the configurations according to a given embodiment. Further, a part of the configurations according to each embodiment may be added to, deleted from, or replaced by another configuration.

Further, a part or entirety of the respective configurations, functions, processing modules, processing means, and the like that have been described may be implemented by hardware, for example, may be designed as an integrated circuit, or may be implemented by software by a processor interpreting and executing programs for implementing the respective functions.

The information on the programs, tables, files, and the like for implementing the respective functions can be stored in a storage device such as a memory, a hard disk drive, or a solid state drive (SSD) or a recording medium such as an IC card, an SD card, or a DVD.

Further, control lines and information lines that are assumed to be necessary for the sake of description are described, but not all the control lines and information lines that are necessary in terms of implementation are described. It may be considered that almost all the components are connected to one another in actuality.

What is claimed is:

1. An analysis apparatus comprising: a memory; an interface communicatively coupled to a web server that hosts a web application: and a processor communicatively coupled to the memory and the interface: wherein the processor: receives, using the interface, at least one log concerning the web application; retrieves, from the memory, a plurality of kinds of use condition feature values based on the log received, wherein the plurality of kinds of use condition feature values indicate a type of device that accessed the web application; analyzing whether a correlation exists between a first kind of use condition feature values and a second kind of use condition feature values in the plurality of kinds of use condition feature values retrieved based on the type of device that accessed the web application; and outputting an analysis result obtained by the processing of the analyzing.

2. The analysis apparatus according to claim 1, wherein the processor further:
receives an operation log of the web server about operations on a web page for the at least one log concerning the web application, and
retrieves the plurality of kinds of use condition feature values derived from the operation log based on the operation log.

3. The analysis apparatus according to claim 1,
wherein the processor further:
receives an operation log of the web server about operations on a web page and an environmental information log identifying operational environments of the web application for the at least one log concerning the web application, and
wherein the processor further retrieves a kind of use condition feature values derived from the operation log as the first kind of use condition feature values based on the operation log and a kind of use condition feature values derived from the environmental information log as the second kind of use condition feature values based on the environmental information log.

4. The analysis apparatus according to claim 1, wherein the processor further: receives an operation log that contains information of a web page and a display log that contains information about displaying the web page on the web server and acquires a kind of use condition feature values derived from the operation log as the first kind of use condition feature values based on the operation log and a kind of use condition feature values derived from the display log as the second kind of use condition feature values based on the display log.

5. The analysis apparatus according to claim 1,
wherein the first kind of use condition feature values includes a third kind of use condition feature values characterizing a web page and a fourth kind of use condition feature values characterizing at least one other web page displayed on the web server prior to the web page, and
wherein the processor further:
analyzes whether a correlation exists between the fourth kind of use condition feature values and the second kind of use condition feature values and, based on a result of the analysis, and
analyzes whether a correlation exists between the third kind of use condition feature values and the second kind of feature values.

6. The analysis apparatus according to claim 1,
wherein the first kind of feature values includes a third kind of use condition feature values characterizing inputs to an input field in a web page and a fourth kind of use condition feature values characterizing inputs to at least one other input field in the web page prior to the input field, and
wherein the processor further:
analyzes whether a correlation exists between the fourth kind of use condition feature values and the second kind of use condition feature values and,
based on a result of the analysis, analyzes whether a correlation exists between the third kind of use condition feature values and the second kind of use condition feature values.

7. An analysis apparatus comprising: a memory; an interface communicatively coupled to a web server that hosts a web application; and a processor communicatively coupled to the memory and the interface; wherein the processor: receives, using the interface, an operation log including an indication of a type of device that accessed web pages of a web server, event types of events of operating the web pages, identification information on operated objects in the web pages, and operation times, and a display log of the web application; designates an event type to be searched for by receiving designation of the event type to be searched for, identifies display times of a web page in which an error occurred in displaying an object from the display log received, acquires operation log records including operation times prior to the display times identified in the identifying and the event type designated in the designating, counting a number of combinations of the event type and identification information on an operated object included in the operation log records acquired in the processing of the acquiring based on the type of device that accessed the web pages, analyzing whether a correlation exists between a first, kind of use condition feature values and a second kind of use condition feature values based on the counting, and outputting a result of the counting.

8. The analysis apparatus according to claim 7,
wherein the processor further:
identifies a number of times of occurrence of the error in each of the web pages,
calculates a probability of occurrence of each of the combinations based on the number of times of occurrence identified and the number of combinations counted, and
outputs a result of the calculating.

9. An analysis method comprising:
receiving, by a processor of an analysis apparatus, at least one log concerning a web application stored in a webserver via a communication interface of the analysis apparatus;
retrieving, by the processor, a plurality of kinds of use condition feature values from a memory of the analysis apparatus based on the log received in the receiving, wherein the plurality of kinds of use condition indicate a type of device that accessed the web application;
analyzing, by the processor, whether a correlation exists between a first kind of use condition feature values and a second kind of use condition feature values in the plurality of kinds of use condition feature values based on the type of device that accessed the web application; and
outputting, by the processor, an analysis result obtained by the analyzing.

* * * * *